(12) United States Patent
Roe

(10) Patent No.: US 6,456,910 B1
(45) Date of Patent: Sep. 24, 2002

(54) LIGHT GUIDED AUTOPILOT

(76) Inventor: John Andrew Roe, 150 Long Pond Rd., Hewitt, NJ (US) 07421

( * ) Notice: Subject to any disclaimer, the term of this patent is extended or adjusted under 35 U.S.C. 154(b) by 0 days.

(21) Appl. No.: 09/717,770

(22) Filed: Nov. 21, 2000

(51) Int. Cl.$^7$ ................................. G05D 1/00
(52) U.S. Cl. .................... 701/23; 701/200; 701/36
(58) Field of Search ................... 701/23, 41, 200, 701/210, 36, 1, 11

(56) References Cited

U.S. PATENT DOCUMENTS

| | | | |
|---|---|---|---|
| 4,132,113 A | * 1/1979 | Lyman, Jr. ............... | 73/178 R |
| 5,107,424 A | * 4/1992 | Bird et al. ................ | 701/21 |
| 5,390,118 A | * 2/1995 | Margolis et al. .......... | 701/23 |
| 6,112,141 A | * 8/2000 | Briffe et al. .............. | 701/14 |
| 6,275,773 B1 | * 8/2001 | Lemelson et al. ........ | 701/301 |

* cited by examiner

Primary Examiner—William A. Cuchlinski, Jr.
Assistant Examiner—Olga Hernandez
(74) Attorney, Agent, or Firm—Michael J. Brown

(57) ABSTRACT

An autopilot system for a vehicle capable of steering the vehicle on a predetermined course by use of laser beams. The invention is comprised of: an off-board mounted laser transmitter, which describes the intended course of the vehicle, a vehicle mounted laser sensor array, a logic control unit, one or more actuators to control vehicle's heading and a user interface.

14 Claims, 6 Drawing Sheets

LIGHT GUIDED AUTOPILOT

FIELD OF INVENTION

This invention is a device to automatically steer a vehicle along a path described by a light beam, preferably a laser light beam.

A particular adaptation of this invention is intended to be used, to accurately steer a water ski towboat through a competition water ski course (slalom, jump, trick, wakeboard, etc.), with a level of consistency that is independent of the skill level of the driver.

Other uses of this invention are envisioned and are intended to be protected by this patent.

BACKGROUND

In competition water skiing, the path and speed of the boat have a critical effect on the performance of the skier. Consistent boat speed and boat path are required, to ensure that the boat driver does not affect the skier's performance.

Systems currently exist, that accurately control boat speed, that, after initial set-up, provide a consistent speed for each skier, independent of input from the driver.

Most current forms of competition also require a straight boat path. Jumping, trick skiing, wakeboarding and knee boarding all require a straight boat path.

Boat path is particularly critical in slalom water skiing, where the boat must travel in a straight boat path 101, on the centerline 102 of the slalom course, between the boat guide buoys 103, while the skier attempts follow the skier path 104, around 6 slalom buoys 105, located 37½ feet from the centerline of the course. See FIG. 3.

In top-level competition, the water ski towline is actually shorter than 37½ feet, so the skier must time his pull, such that he arrives at the slalom buoy at approximately the same time the boat passes it 37½ feet away and must reach inside the buoy to hold onto the towline, while he skis around the buoy.

If the boat path 101 deviates from the center of the course, by even a few inches, it will critically affect the skier's ability to ski around the buoy. This gives an unfair advantage when the boat is closer to the buoy and disadvantage when the boat is farther away.

Although top-level drivers can accurately maintain a straight boat path, any driver error will affect the skier's performance.

This invention eliminates the possibility of driver error and ensures a consistent, straight boat path 101, through the center of the course.

SUMMARY OF THE INVENTION

The invention is a hardware and logic (software) system consisting of sensors, a logic control unit 5 and actuators to control the direction of a vehicle, along a path described by a beam of laser light, which utilizes one or more of many possible steering means 106.

Possible steering means include, but are not limited to: steerable wheels, steerable skis, such as on a snow mobile, or differential speed between drive treads, such as on a bulldozer or a snow cat.

If the vehicle is a marine vessel, possible steering means include, but are not limited to: 1. a rudder, as in a typical inboard powerboat, 2. changing the direction of propulsion thrust, as in typical outboard, inboard/outboard and water-jet powered vessels, 3. one or more side facing propellers or jets similar to bow and stern thrusters, employed on large motor yachts and commercial vessels.

DETAILED DESCRIPTION OF THE PREFERRED EMBODIMENT

Figure 1:
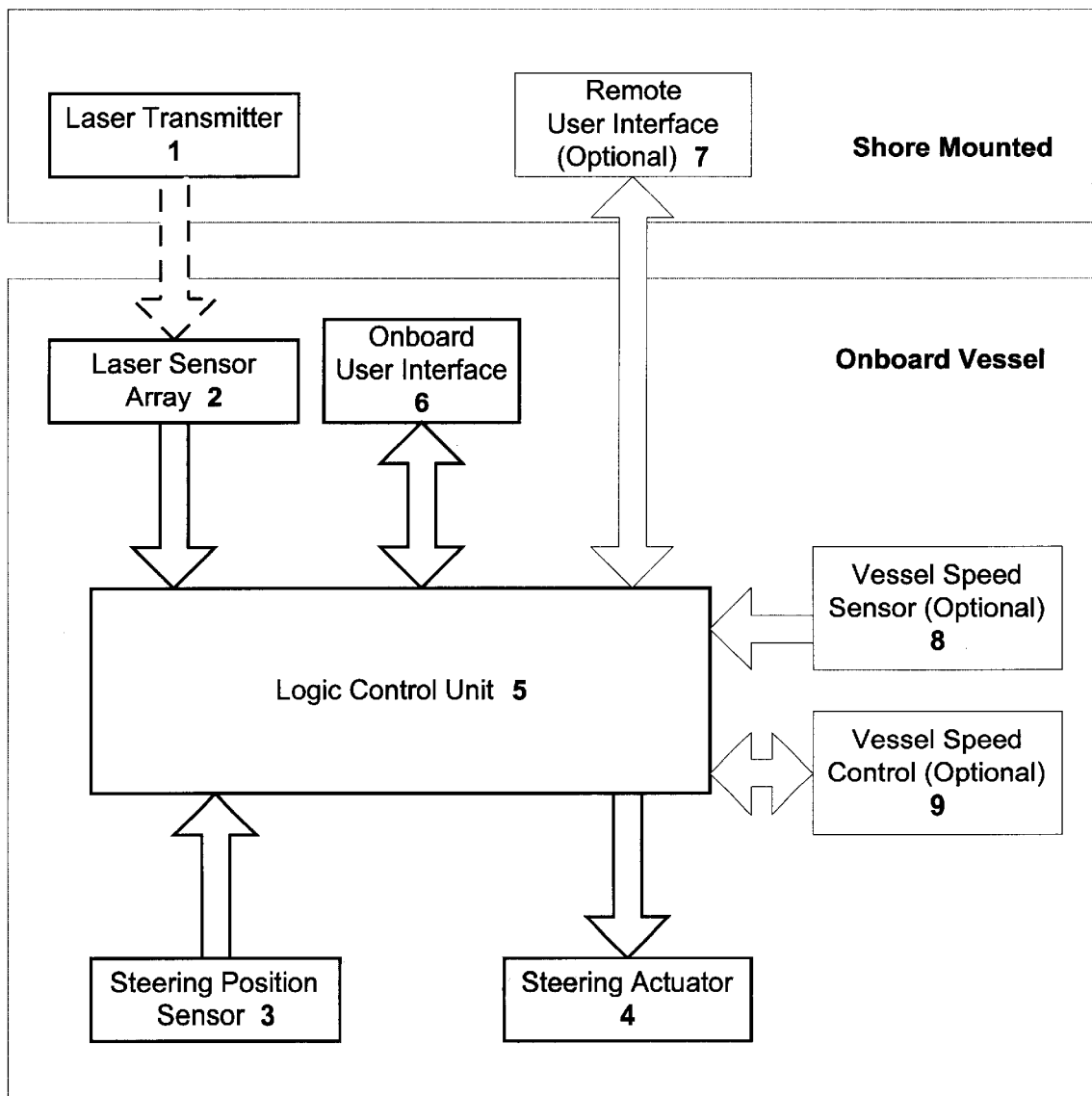
FIG. 1 is a system block diagram for a preferred embodiment of the invention
Figure 2:
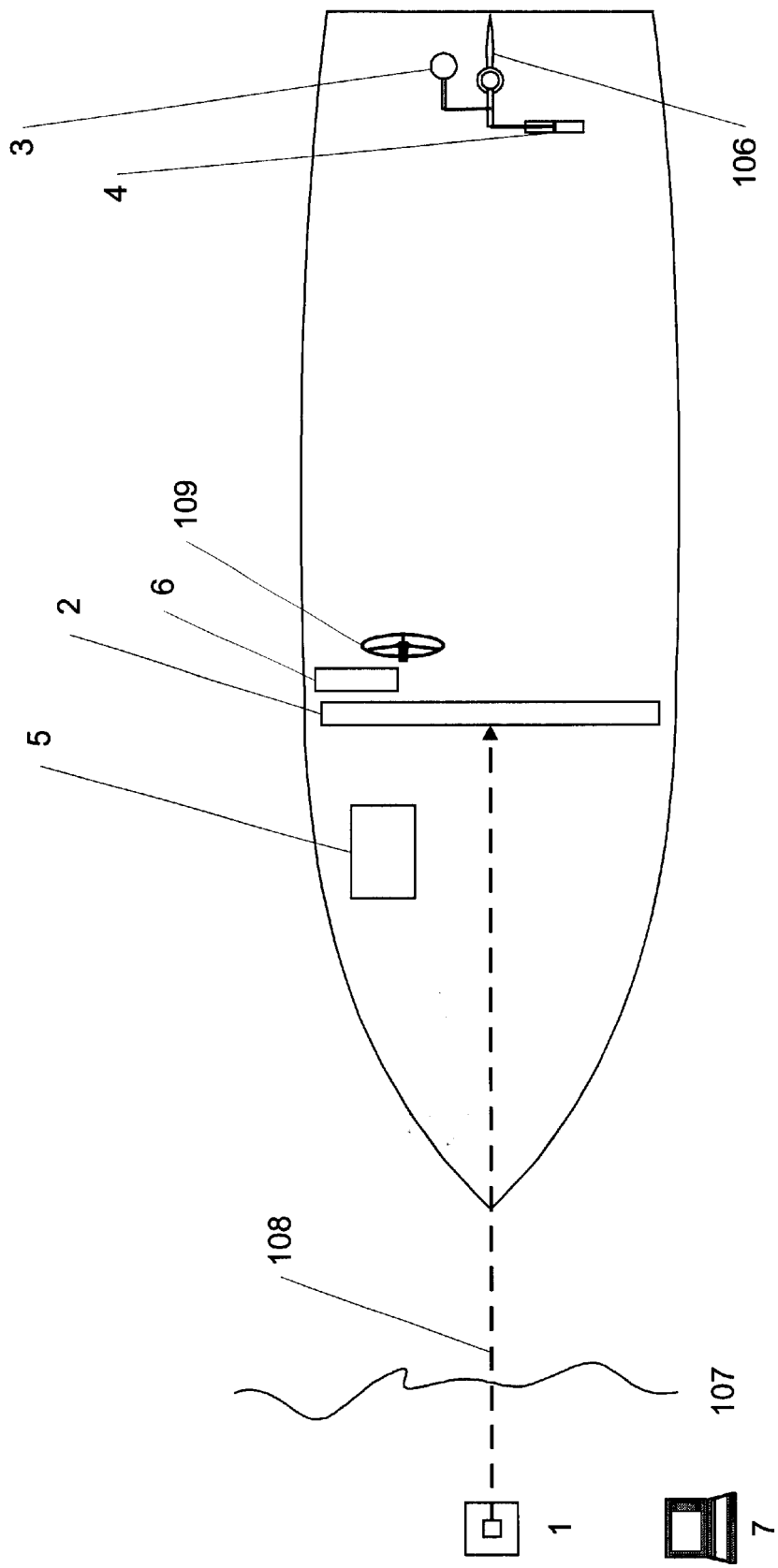
FIG. 2 is a schematic plan view of the equipment configuration as installed on a typical inboard powered vessel.

The invention preferably consists of the following elements: a laser transmitter, a laser sensor array, a steering position sensor, a steering actuator, a logic control unit, and an onboard user interface. Additional optional components may include one or more of the following: a remote user interface, a vessel speed sensor, a vessel speed control, and protective eyewear.

The laser transmitter 1 is a laser source that transmits a vertically oriented plane of light down the centerline of the intended boat path 101. In addition to the laser transmitter 1 itself, the laser transmitter system includes mounting brackets and tracks, to facilitate alignment with the desired boat path 101 centerline.

The laser transmitter 1 can be mounted in a fixed location or attached to a moving vehicle. In the water ski application and similar applications, the laser transmitter is mounted in a fixed location at the end of the ski course. It can be mounted on shore 107 or on a fixed platform securely mounted to the lake bottom.

The laser transmitter 1 can be a rotating beam laser source, similar to units commonly used in the construction industry for leveling and grading or it can be one or several point source lasers aligned parallel to one another, in a vertical plane.

If the laser transmitter 1 is a rotating beam laser source, the laser internal to the laser transmitter 1 emits a linear beam of coherent light. This linear beam is focused on a rotating prism, which refracts the light 90° and by rotating, creates a plane, such that any point on the plane receives a pulse from the laser transmitter 1, once for each revolution of the prism. In the following discussion, this plane of light is referred to as the "laser beam" 108.

Rotation speed of the prism is a critical design factor, which must be considered when developing any embodiment of this invention. Rotation speed of the prism determines the vehicle position update frequency, for the entire system.

If the laser transmitter 1 is constructed by aligning several point source lasers in a vertical plane, the spacing between laser sources must be less than or equal to the height of the laser sensor array 2, such that a least one of the lasers is detected by the laser sensor array 2. If the lasers are spaced too far apart, one laser can be above the laser sensor array 2, while the next laser is below the laser sensor array 2. This situation, the laser transmitter 1 and the laser sensor array 2 are aligned in a horizontal plane, but the laser isn't detected, because the vertical spacing is too large.

Most vehicles have a natural sinusoidal vertical motion as they travel. This is caused by suspension springs and dampers on a land vehicle or by lift on the hull of a marine vessel. If the vehicle has a predictable vertical motion, the vertical spacing between the laser sources must be less than the amplitude of the vertical movement of the vehicle. In this case, the vehicle position update frequency is determined by the frequency of the vertical motion of the vehicle.

The system can include one or multiple laser transmitters 1. If multiple laser transmitters 1 are employed, they can be aligned such that they describe a straight path or the laser beams 108 can cross at an angle. The intersection of two laser beams 108 is called a waypoint.

Figure 4:
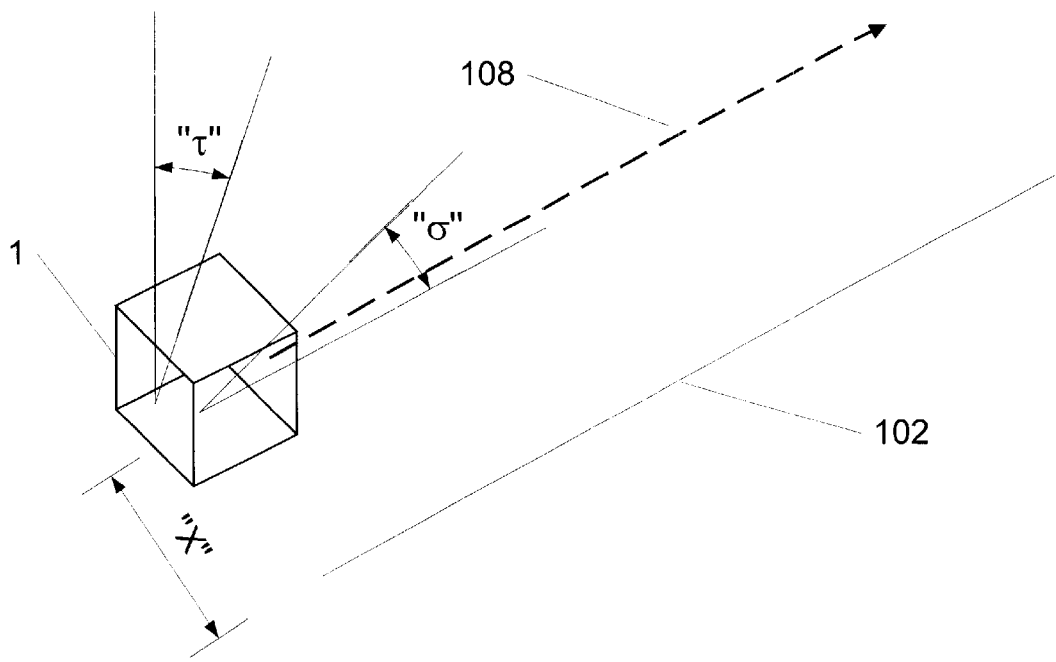
FIG. 4 is a 3-D schematic describing skew angle, tilt angle and horizontal offset for laser transmitter 1 alignment.
Figure 5:
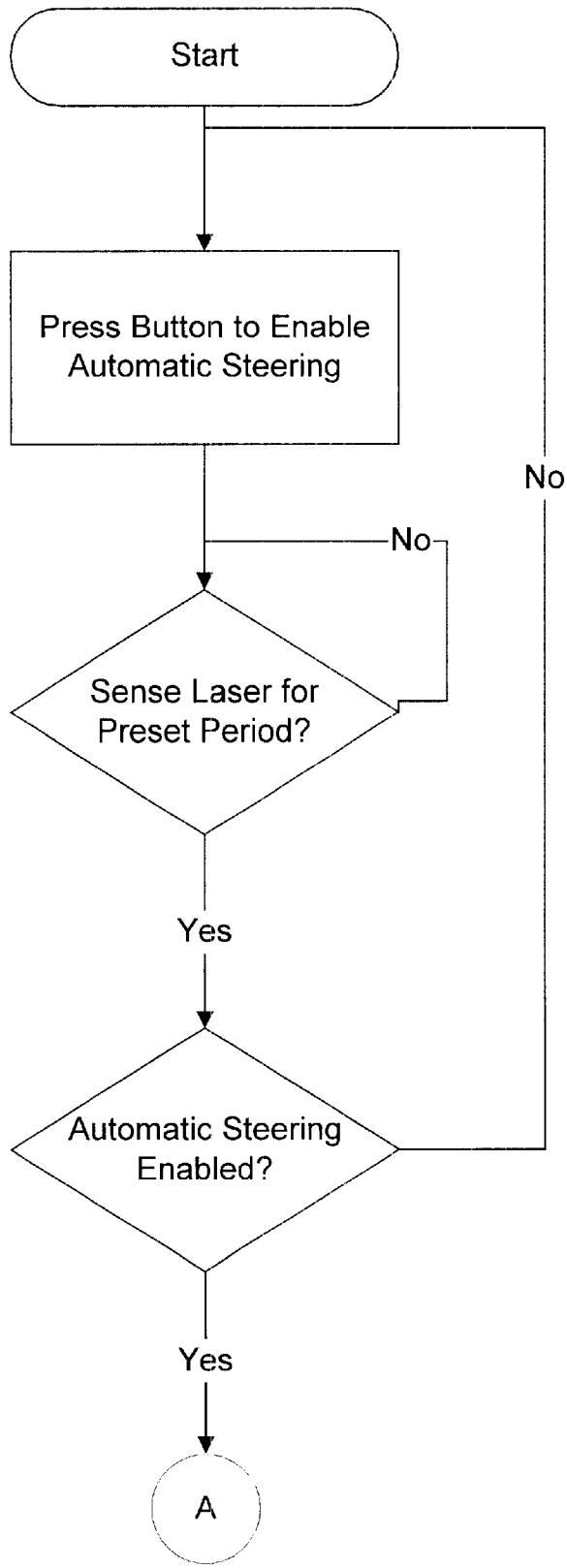
FIG. 5 is a logic flow chart that describes the basic concept for the automatic steering logic, as employed in a preferred embodiment of the invention
Figure 5:
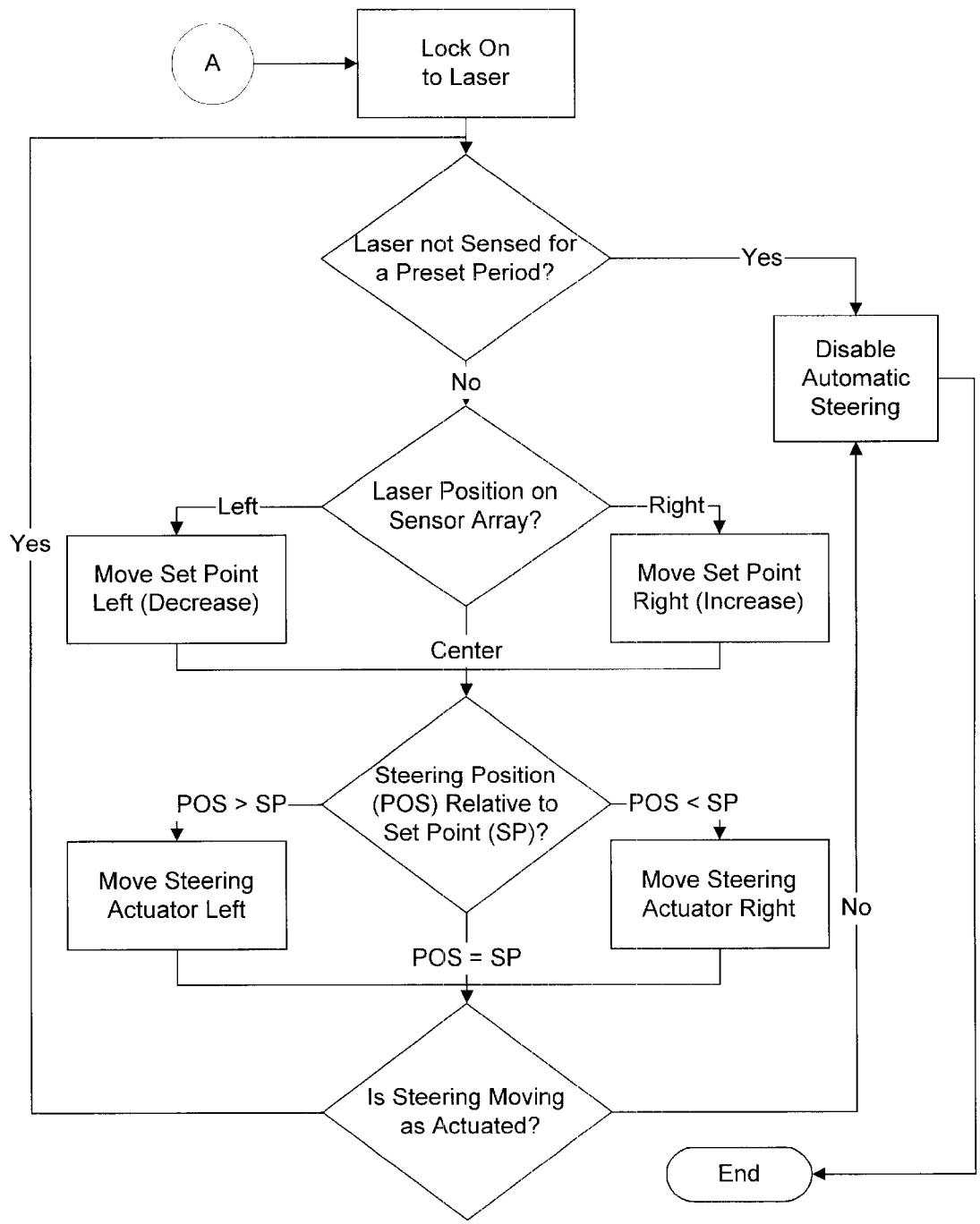

The plane of light emitted by the laser transmitter 1 must be aligned in all three axes. In the horizontal plane, the laser beam 108 must be aligned to the center of the intended boat path 101. A system of brackets and tracks can be included, that allows adjustment of the laser beam 108 right and left across the width of the course such that the offset "X" between the intended boat path 101 and the laser beam 108 is zero and adjustment of the horizontal skew angle "σ" across the course, such that the beam is aligned parallel to the centerline of the course 102. See FIG. 4.

In a slalom water ski application, the intended boat path 101 is always coincident with the centerline of the slalom course 102.

A design that allows for easy horizontal adjustment is particularly important in a competition water ski jump application, where the boat path 101 must be parallel to the centerline of the course 102, but the horizontal offset "X" of the boat path 101 from the course centerline 102 may be changed for each skier.

This system of brackets and tracks can be either manually adjusted or automatically driven using servomotors, stepper motors, hydraulic cylinders or other means.

The vertical tilt "τ" of the plane of light must also be adjusted to 90°, from the horizontal plane. See FIG. 4. The laser transmitter 1 may include a self-leveling feature that automatically aligns the transmitted plane of light, to a plumb (0° tilt) vertical orientation. Alternately, the laser transmitter 1 can be manually aligned to plumb.

For safety reasons, a Class IIIa laser or below is preferred. If a higher powered laser is used, protective eyewear may be required. If protective eyewear is required or suggested because of safety considerations, it can be included as part of the autopilot system.

The light color emitted by the laser transmitter 1 can be either visible or invisible.

The laser sensor array 2 is comprised of one or multiple arrays of photovoltaic laser detection devices. They can be mounted such that they sense a laser beam 108 from the front, back, side or any other direction. Side facing laser sensors can be used detect a second laser beam 108 at a waypoint.

For the water ski application, the laser sensor array 2 is comprised of two continuous arrays of photovoltaic laser detection devices. The two arrays are mounted in a common package and are aligned so that the first detects the laser from the laser transmitter 1, when the boat is going towards the transmitter and the second detects the laser, when the boat is headed away from the transmitter.

The laser sensor array 2 assembly is mounted across the top of the windshield or on a superstructure constructed for the purpose, which allows a clear unobstructed view both forward and aft. The centerline of the laser sensor array 2 is mounted coincident with the longitudinal centerline of the vessel, several feet above and parallel to the keel.

Forward to aft location of the laser sensor array 2 must be considered when selecting a mounting location. Ideally, the laser sensor array 2 should be located at the axis of steering rotation. Locating the laser sensor array 2 too far forward or too far aft may require separate steering coefficients, in the steering logic, for going toward the laser transmitter 1 or away from it.

If mounting the laser sensor array 2 away from the axis of steering rotation is unavoidable, or if the axis of steering rotation changes appreciably with vessel speed or loading, a means of inputting direction (toward or away from the laser transmitter 1) to the logic control unit 5 must be provided. Direction can be input either manually through the onboard user interface 6 or automatically by using an electronic "fluxgate" compass or other direction-sensing device.

If a fluxgate compass is used, the system can function as a traditional magnetic autopilot system, in situations where installation of the laser transmitter 1 is impractical.

The laser sensor array must be wide enough, so that the laser signal can be clearly detected when the boat is moved laterally by the wind, a wave or the skier's pull. Logic can be included to detect a lost laser signal and determine which direction to turn to find the laser.

Output from the laser sensor array 2 is connected to the logic control unit 5.

Figure 3:
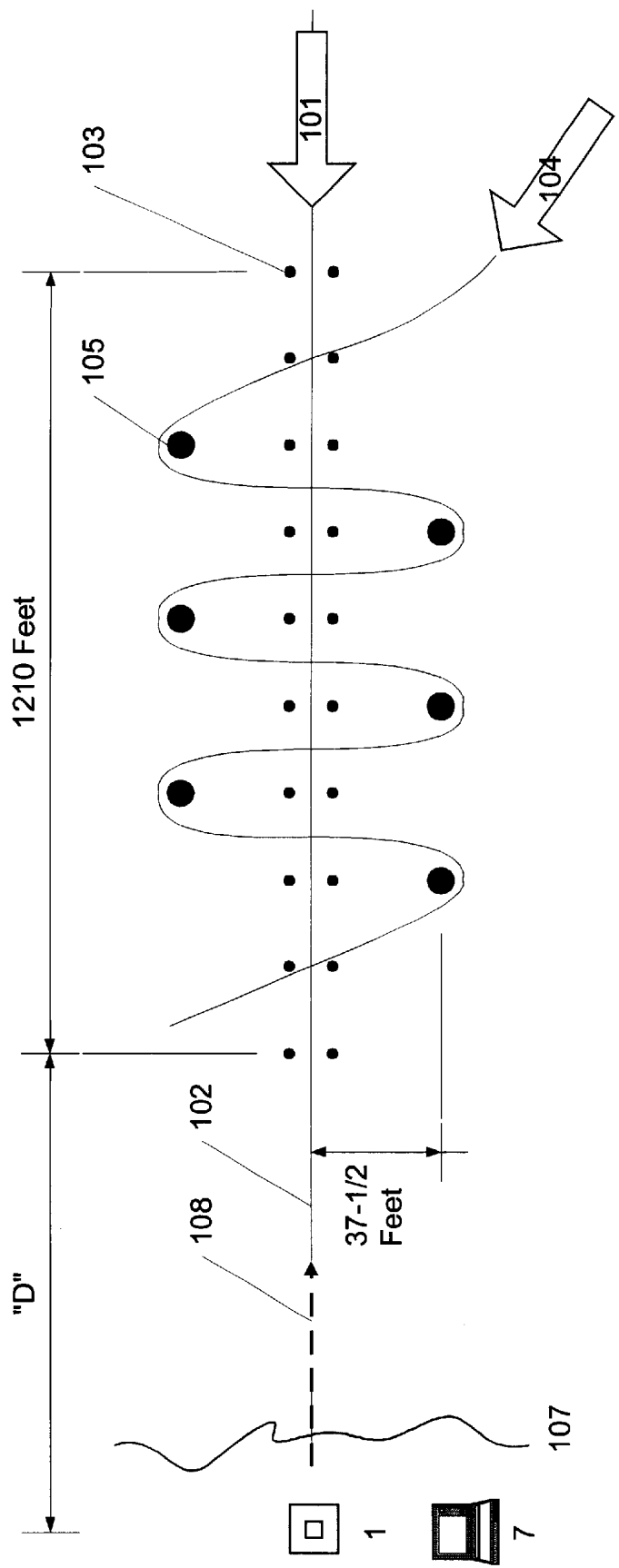
FIG. 3 is a plan view of a regulation slalom water ski course showing the boat path 101, the skier path 104 and the location of the laser transmitter 1

The laser transmitter 1 and the laser sensor array 2 must be designed work together as a system, such that the signal from the laser transmitter 1 can be detected by the laser sensor array 2, both when the boat is at the end of the course that is farthest from the laser transmitter 1 and when the boat is within several feet of the laser transmitter 1. A regulation slalom course is 2010 feet long. In a typical installation, the distance from the end of the course to a location on shore can where the laser transmitter 1 can be mounted (dimension "D" on FIG. 3) can be 500 feet or more. Therefore, at a minimum, the laser sensor array 2 must detect the laser beam 108 over the full distance range from 0 feet to over 2500 feet, for this embodiment. Sensing ranges may be shorter or longer for other embodiments. Multiple laser transmitters 1 can be used for applications where one laser transmitter 1 cannot accommodate the entire distance range. Trick and jump courses are shorter than a slalom course, so a system designed for the slalom application will work in a trick or jump application.

The steering position sensor 3 is a transducer that senses the position of the steering means 106, relative to its travel limits, full left and full right. It can be either an analog or a digital transducer.

An analog implementation of the steering position sensor 3 could be a variable resistor (potentiometer) or a device that varies voltage based on steering position.

In the preferred embodiment, the steering position sensor 3 is a quadrature type digital encoder. It outputs two square wave pulse trains that are phased 90 degrees relative to one another, which allow the logic control unit 5 to determine distance and direction of travel.

Depending on the type of steering actuator 4 employed in a particular embodiment, the steering position sensor 3 can be either a linear device or a rotary device.

The steering position sensor 3 is connected to the logic control unit 5.

In some vehicles for which the present invention may be used, there are no fixed limits for the steering means 106 position, such as a vehicle steered by treads, like a bulldozer or a vessel controlled by one or more side facing propellers or jets. In these embodiments a steering position sensor 3 is not required.

The steering actuator 4 is a servo that, either directly or indirectly, controls the steering means 106, based on output signals from the logic control unit 5. The steering actuator 4 can be linear acting or rotary depending on the steering means 106 employed. Is can be an electrical motor or a hydraulic pump and valve assembly, depending on the primary steering means employed on the vessel.

It can be connected directly to the steering means 106 or to the vessel's helm 109.

In the preferred embodiment, the steering actuator is an electrical servomotor and the steering actuator 4 and the steering position sensor 3 are constructed as a single unit that is connected to the vessel's helm 109.

In the case of a vehicle steered by treads or a vessel steered by side facing propellers or jets, the steering actuator 4 can be electrical relay contacts or hydraulic valves that directly control the speed and direction of the treads or thrust and direction of the propellers or jets.

The logic control unit 5 is a microprocessor based device, that utilizes input data from the laser sensor array 2, along with the vessel's speed, direction (toward or away from the laser transmitter 1) and loading (crew weight), to determine the appropriate control outputs to the steering actuator 4, to control the steering means 106, in order to maintain a straight boat path 101, described by the laser beam 108, from the laser transmitter 1.

The logic control unit 5 includes one or multiple data storage elements, which store system presets, data tables, input and output histograms and other data required to operate and evaluate the performance of the system.

When the invention is utilized on an inboard, inboard/outboard or water-jet powered vessel, the logic control unit 5 receives an additional input, from the steering position sensor 3, indicating the actual position of the steering means 106.

In this application, the logic control unit 5 determines a set point for the steering means 106, based output from the laser sensor array 2, vessel speed, direction and loading and controls the steering actuator 4 to move the steering means 106 in the appropriate direction, until the set point is reached.

The set point is recalculated dynamically, based on the changing input data from the laser sensor array 2.

Vessel speed can be either a parameter input through the user interface 6 or dynamically measured, using the optional vessel speed sensor 8.

Optionally, the logic control unit 5 can also control vessel speed utilizing the vessel speed control unit 9.

The onboard user interface 6 is comprised an LED, LCD or other type of display device and one or more input pushbuttons, to provide a means for the user to input the desired vessel speed, loading, and direction to the logic control unit 5, to modify various set-up parameters, such as steering coefficients, vessel speed tables and loading tables, etc., as required by the particular embodiment and to monitor the current state and historical performance of the system.

The display indicates information about the current state of the system, such as whether the system is "locked on" to the laser beam 108 or not, the position of the laser beam 108 on the laser sensor array 2, the position of the steering means, as detected by the steering position sensor 3, the speed and direction of the steering actuator 4, vessel speed as determined by the vessel speed sensor 8, etc.

The onboard user interface 6 can also display historical information about performance of the system, such as a histogram of the boat path 101, as detected by the laser sensor array 2, a histogram of the position of the steering means 106 as sensed by the steering position sensor 3 and histogram of vessel speed as measured by the vessel speed sensor 8.

The onboard user interface 6 is typically mounted in or on the dashboard of a vessel, so that it can be viewed and accessed by the boat driver.

In addition to being available onboard through the onboard user interface 6, the state and historical information described above can be transmitted via serial connection (RS-232, RS 422, Ethernet, etc.) or radio frequency signal, to a remote user interface 7.

The remote user interface 7 can be a purpose built microprocessor based device or a commercially available personal computer, that can be used to monitor the state and historical performance of the system and to input the various parameters described above.

Because the size and configuration of the remote user interface 7 is not limited by its location, as the onboard user interface 6 is, it can have a larger display and a full PC type keyboard, which allows it to display system information in a more intuitive manner. This device is useful for diagnosing system problems and for tuning the system for optimal performance.

Additionally, when used in competition water skiing or in a similar application, the remote user interface 7 can be located on shore, and using a radio frequency communication link, the historical performance data can be recorded and used for scoring the competitor's performance.

Typically, the remote user interface 7 will be mounted onboard and connected via a hardwired serial link for set-up and diagnostic purposes and mounted on shore and connected via radio frequency link for scoring.

One or multiple paddle wheel, pilot tube or other type speed transducers can be utilized to sense vessel speed, for use by the logic control unit 5.

Alternately, the system can calculate vessel speed by sensing the boat guide buoys 103 and measuring the time between buoys.

Addition of an engine RPM transducer, a digital encoder that senses engine RPM, and a servo to control engine throttle position allows the logic control unit 5 to control the vessel's speed, as well as its path.

The steering logic is the software running on the logic control unit 5, which determines the control output to the steering actuator 4, based on inputs from the laser sensor array 2, the steering position sensor 3, the vessel speed sensor 8 and the various input parameters described above.

Regardless of the vessel type or steering means employed, the amount of steering actuation required to achieve a given change in direction varies with vessel speed.

The logic control unit 5 utilizes a data table containing a list of possible vessel speeds, with their associated steering coefficients.

Likewise vessel loading (crew weight) and skier weight can also affect the amount of steering input required. The steering logic includes similar tables with crew weights and skier weights, with their associated steering coefficients Using a Proportional/Integral/Differential (PID) or similar algorithm, the system utilizes the steering coefficients to calculate the desired steering means position.

The system uses a second PID or similar algorithm to calculate the appropriate output to the steering actuator 4, to achieve the desired steering means 106 positions.

These two control loops operate simultaneously and interact dynamically to steer the vessel.

The system can also include logic to control switching control from one laser beam 108 to another at a waypoint and such other logic as may be required to control steering and other features, in other embodiments.

Operation

When the system is powered on, the driver must select the desired vessel speed, crew weight and skier weight through the onboard user interface 6. He then presses the Enable Button, to enable automatic steering. The onboard user interface 6 indicates the fact that automatic steering is enabled.

When automatic steering is enabled, the laser sensor array 2 begins looking for input from the laser transmitter 1. Typically the driver will manually steer the vessel until it is lined up with the laser transmitter 1 and the laser beam 108 is detected. Once the laser beam 108 is detected, the system locks on to the laser beam 108 and the system begins to automatically steer the vessel. The fact that the system is locked on is indicated on the onboard user interface 6.

The basic premise of the automatic steering logic is to steer the vessel such that the laser beam 108, from the laser transmitter 1, stays in the middle of the laser sensor array 2. The logic control unit S takes continuously updated input, from the laser sensor array 2 and determines if the laser beam 108 is in the center, off to the left or off to the right.

Determining the Steering Set Point

The amount of steering required to get the vessel back on course is determined dynamically, based on the vessel's speed, the crew weight, the skier weight, the associated steering coefficients, the distance of between the sensed laser beam 108 position and the center of the laser sensor array 2 and the rate of change of that distance.

The calculated amount of steering required to steer the center of the vessel back to the beam is called the steering set point.

If the beam is off to the left, the logic control unit 5 updates the steering set point to steer the vessel left, so the center of the vessel moves toward the center of the beam. If the beam is off to the right, the steering set point is moved right.

The vehicle position update frequency, determined by the rotation speed of the prism in the laser transmitter 1, directly affects the calculated steering set point. For a given vehicle speed, the amount of steering required correct a given course deviation will be decrease, if the vehicle position update frequency is increased.

For example, if the rotation speed is 300 RPM, the vehicle position is updated once every 200 milliseconds. At 1200 RPM the vehicle position is updated every 50 milliseconds. If the vehicle is slightly off course, the amount of steering required to steer the center of the vehicle back to the center of the laser beam 108, will be considerably less, if the vehicle position is updated every 50 milliseconds, than if the vehicle position is updated every 200 milliseconds.

If the rotation speed is too slow for the vehicle speed, the vehicle will not be able to maintain a straight path and it will zigzag back and forth in a sinusoidal fashion.

Controlling the Steering Actuator

The logic control unit 5 continuously monitors the steering set point and the actual steering position, as determined by the steering position sensor 3. The logic control unit 5 energizes the steering actuator 4 to move the steering means 106, such that the actual steering position becomes equal to the set point.

Manual Override

Under normal logic control, the logic control unit directs the steering actuator 4 to move the steering means 106, in the desired direction, at a known rate. This steering rate is sensed by measuring the rate of change of the input from the steering position sensor 3. If the rate of change is different than directed by the logic control unit 5, the logic control unit 5 determines that the steering actuator 4 is being manually overridden and immediately disables the output to the steering actuator 4, which allows the vessel to be steered manually.

Automatic steering can be re-enabled by pressing the enable button, on the onboard user interface 6.

This document describes the invention installed on a boat used for competition water skiing. It is understood that the invention can be applied in other situations that require a vessel or a vehicle to be steered along a straight path. Many modifications and variations will be apparent to those skilled in the art. Therefore the scope of this invention is defined by the following claims.

I claim:

1. An autopilot for a vehicle, where the vehicle includes steering means capable of being in a range of positions, the autopilot comprising:

A light source transmitter which emits light in a direction toward the vehicle, the light source transmitter located remote from the vehicle;

At least two detecting sensors capable of detecting the emitted light, each detecting sensor having a data output;

Data processing means for receiving data output from detecting sensors and calculating a desired vehicle course;

means for controlling the steering means of the vehicle, said steering control means being operably controlled by the data processing means; and a user interface comprising signals for informing a user as to one or more of the following data: vehicle speed, vehicle direction of travel, vehicle distance from a point remote from the vehicle, vehicle course information, vehicle load information, light source orientation, light source signal strength, and orientation of the vehicle's steering means, the user interface capable of receiving data from the data processing means.

2. The autopilot of claim 1, further comprising:

A direction sensor for detecting the vehicle's direction of travel, the direction sensor having a data output which interfaces with the data processing means.

3. The autopilot of claim 1, further comprising:

A speed sensor for detecting the vehicle's travelling speed, the speed sensor having a data output which interfaces with the data processing means.

4. The autopilot of claim 1, further comprising:

A steering orientation sensor for detecting the orientation of the vehicle's steering means, the steering orientation sensor having a data output which interfaces with the data processing means.

5. The autopilot of claim 1, where the user interface is located remote from the vehicle and the data processing means further comprises remote data transmission means for transmitting data to the remote user interface.

6. The autopilot of claim 1, where the data processing means controls a steering actuator based on a desired steering means position and an actual steering means position.

7. The autopilot of claim 1, where the light source transmitter is a laser.

8. The autopilot of claim 1, where the light source transmitter is a rotating beam laser transmitter.

9. The autopilot of claim 1, where the emitted light is in the form of a plane.

10. The autopilot of claim 1, further comprising at least one additional light source transmitter.

11. The autopilot of claim 1, further comprising means for controlling the speed of the vehicle.

12. An autopilot for a vehicle, where the vehicle includes steering means capable of being in a range of positions, the autopilot comprising:

A plurality of light source transmitters, where each light source transmitter emits light in a direction toward the vehicle and each light source transmitter is located remote from the vehicle;

At least two detecting sensors for detecting the emitted light, each detecting sensor having a data output;

Data processing means for receiving data output from detecting sensors and calculating a desired vehicle course;

means for controlling the steering means of the vehicle, said steering control means being operably controlled by the data processing means; and a user interface comprising signals for informing a user as to one or more of the following data: vehicle speed, vehicle direction of travel, vehicle distance from a point remote from the vehicle, vehicle course information, vehicle load information, light source orientation, light source signal strength, and orientation of the vehicle's steering means, the user interface capable of receiving data from the data processing means.

13. The autopilot of claim 12, where the emitted light is in the form of a plane.

14. A method for controlling a vehicle remotely, the method comprising the steps of:

transmitting a light signal to the vehicle from a remote location; detecting the light signal at the vehicle;

calculating the vehicle's travel direction and speed relative to the detected light signal;

adjusting the direction of travel of the vehicle; and providing information as to one or more of the following data: vehicle speed, vehicle direction of travel, vehicle distance from a point remote from the vehicle, vehicle course information, vehicle load information, light source orientation, light source signal strength, and orientation of the vehicle's steering means.

* * * * *